United States Patent [19]
Aeschbach et al.

[11] Patent Number: 6,120,000
[45] Date of Patent: Sep. 19, 2000

[54] QUICK MOUNT BASE FOR ATTACHING AN ELECTRICAL COMPONENT TO A MOUNTING RAIL WITH AN EDGE STRIP

[75] Inventors: Bruno Aeschbach, Reinach; Daniel Brugger, Suhr; Hans-Peter Meili, Seon; Karin Hannelore Spengler-Schmid; Stephan Spengler, both of Siblingen, all of Switzerland

[73] Assignee: Rockwell Technologies, LLC, Thousand Oaks, Calif.

[21] Appl. No.: 09/058,079

[22] Filed: Apr. 9, 1998

[30] Foreign Application Priority Data

Sep. 5, 1997 [CH] Switzerland .............................. 2087/97

[51] Int. Cl.⁷ .................................................. A47G 29/00
[52] U.S. Cl. .................. 248/694; 248/228.7; 248/228.1; 248/222.11; 248/220.21
[58] Field of Search ............................ 248/228.7, 228.1, 248/222.11, 220.21, 200, 694, 214, 125.1, 298.1, 323, 222.12; 361/679, 683, 807, 809, 825, 752, 796, 801, 802; 211/26, 162; 312/223.2

[56] References Cited

U.S. PATENT DOCUMENTS

| | | | |
|---|---|---|---|
| 1,236,458 | 8/1917 | McDonald | 248/222.12 X |
| 2,976,005 | 3/1961 | Stell | 248/298.1 |
| 3,288,414 | 11/1966 | Fortunato | 248/222.12 |
| 3,297,290 | 1/1967 | Patterson | 248/222.12 |
| 3,463,432 | 8/1969 | Ptak | 248/228.7 |
| 4,067,529 | 1/1978 | Milcoy | 248/222.12 |
| 5,392,196 | 2/1995 | Kinner | 361/809 |
| 5,681,116 | 10/1997 | Lin | 248/298.1 X |
| 5,768,091 | 6/1998 | Vinson et al. | 361/825 X |
| 5,907,476 | 5/1999 | Davidsz | 361/732 |

FOREIGN PATENT DOCUMENTS 652269  10/1985  Switzerland .

*Primary Examiner*—Anita M. King
*Assistant Examiner*—Nasdi Sanders
*Attorney, Agent, or Firm*—David G. Luettgen; John J. Horn; William R. Walbrun

[57] ABSTRACT

A quick mount base provided to attach electrical components to a mounting rail features a housing composed of plastic. At least one retainer spring wire is inserted in a hollow space of the housing that faces the mounting rail. An end area of the retainer spring wire terminates as a sharp edge that rests in a self locking manner with one tip on an edge strip of the mounting rail, whereby the retainer spring wire is secured from longitudinal movement in the direction facing away from the end area at the edge strip of the mounting rail, but permits outward bending.

15 Claims, 1 Drawing Sheet

QUICK MOUNT BASE FOR ATTACHING AN ELECTRICAL COMPONENT TO A MOUNTING RAIL WITH AN EDGE STRIP

BACKGROUND OF THE INVENTION

1. Field of the Invention

The present invention relates to a quick mount base for attaching an electrical component to a mounting rail with an edge strip. More particularly, the invention pertains to a quick mount base having a housing comprised of plastic, with at least one retaining spring wire inserted in a hollow space of the housing that faces the mounting rail. The retaining spring wire rests against the edge strip of the mounting rail in a springy manner during operation and presses an opposing catch groove of the housing against the opposite edge strip of the mounting rail. The retaining spring wire is pressed back into the housing when the housing is removed from the mounting rail by sliding the housing against the action of the retaining spring, whereby the edge strip of the mounting rail leaves the catch groove on the side of the housing opposite the retaining spring wire, making the removal of the housing from the mounting rail possible.

2. Description of the Prior Art

A quick mount base generally of the type indicated in the introduction is shown in Swiss Patent No. CH-A5-652269. With this quick mount base, the housing comprises a plastic coupling piece onto which an electrical device or a printed circuit board can be fastened. A retaining spring wire composed of round stock is inserted in a hollow space of the housing that faces the mounting rail with the wire resting with its round surface against the edge strip of the mounting rail in a springy manner during operation. In order to take the housing from the mounting rail, the housing is pressed transverse to the longitudinal direction of the mounting rail against the action of the retaining spring wire, whereby the edge strip of the mounting rail leaves the catch groove on the side opposite the retaining spring wire, after which the housing can be swiveled from the mounting rail. A great disadvantage of this quick mount base lies in the fact that the quick mount base can slip on the mounting rail in the longitudinal direction, since neither the catch groove nor the round spring material of the retaining spring wire can prevent slippage on the mounting rail.

SUMMARY OF THE INVENTION

Accordingly, it is an object of this invention to provide a quick mount base of the initially indicated type, which cannot slip in the longitudinal direction on a mounting rail The task as defined is accomplished in that the end area of the retaining spring wire terminates in a sharp edge which rests, with its tip, against the edge strip of the mounting rail at a vertical angle so as to be self locking, whereby the retaining spring wire is held in the housing in the direction facing away from the end area at the mounting rail, but permitting outward bending. This simple and economically advantageous arrangement prevents slippage of the quick mount base on the mounting rail.

The retaining spring wire can feature an angled shape with two straight lines that are at an obtuse angle relative to each other. The shorter end area of which terminates as a sharp edge and rests on the edge strip of the mounting rail with its tip at a vertical angle so as to be self locking, and secures the longer partial area that connects to it in the housing in the direction facing away from the shorter end area from moving longitudinally, but permits outward bending, whereby the shorter end area of the angled retaining spring wire includes a greater vertical angle relative to the longitudinal direction of the mounting rail than the longer partial area held at the housing. The angled shape permits the retaining spring wire to be pressed back into the housing during removal of the quick mount base from the mounting rail, without practically changing the position of the tip of the retaining spring wire on the edge strip of the mounting rail. The end of the shorter end area of the retaining spring wire digs into the edge strip of the mounting rail with its sharp edge and thus supports the housing in the direction of locking oriented against the tip of the vertical angle of the shorter end area. This arrangement is thereby self locking.

Advantageously, two retainer spring wires oriented so as to face away from each other connect to the two ends of a base part attached in the hollow space of the housing as two one piece bent knees, whereby the retainer spring wires and the base part are formed as one piece from a spring wire, and the two bent knees rest at support points of the housing. The two retainer spring wires that face away from each other secure the housing from slippage on the mounting rail in both directions. The retainer spring wires are formed of a one spring wire piece with the base part fastened in the housing to provide a simple arrangement for purposes of manufacture and also for assembly.

The longer partial areas of two retainer spring wires that face away from each other and are angled can connect as two one-piece bent knees on both ends of a base part fastened in a hollow space, whereby the retainer spring wires and the base part are formed as one piece from a spring wire, and the two bent knees rest on support points of the housing. With this arrangement, an advantageous springiness results when the retainer spring is pressed back into the housing.

The fastening of the base part in the housing advantageously takes place with a W-shaped bent part of the spring wire held in the housing at the center and on both sides of center. Mounting of the base part in the housing by this manner is extraordinarily advantageous.

An exemplified embodiment of the invention is described in more detail in the following on the basis of the accompanying drawings.

DETAILED DESCRIPTION OF THE PREFERRED EMBODIMENT

Figure 1:
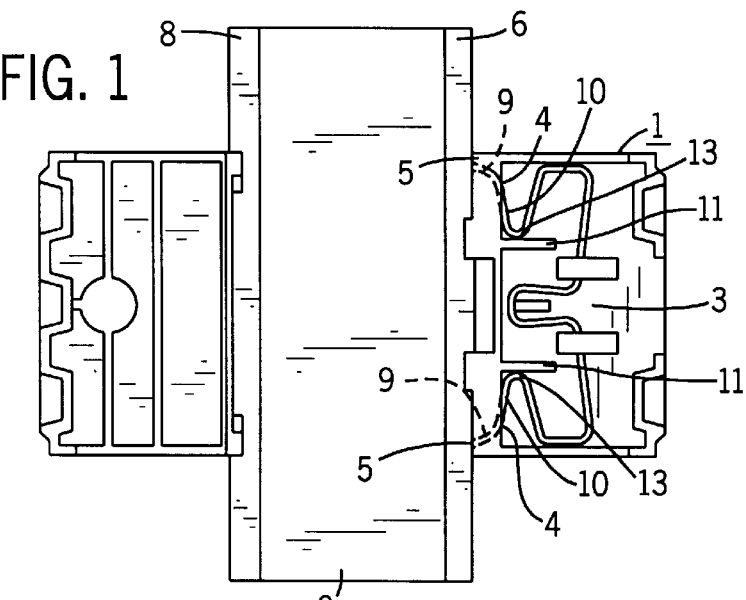
FIG. 1 is a bottom view of a quick mount base of the present invention snapped onto a mounting rail.

Referring now to the drawings, FIG. 1 illustrates the housing 1 of a quick mount base or device, with a part of a mounting rail 2 that bears it. The quick mount base serves to fasten electrical components that are not shown in greater detail, which are first attached on the housing 1 of the quick mount base and then attached with the quick mount base to the mounting rail 2. The housing 1 of the quick mount base is composed of plastic and features a hollow space 3 on the side facing the mounting rail 2. Two retainer spring wires 4 are inserted in this hollow space and, during operation in an engaging position, rest against edge strip 6 of the mounting rail 2 in a springy or biased manner by means of tips 5 positioned at their ends. During operation, the retainer spring wires 4 press the catch groove 7 of the housing 1, as illustrated in FIG. 2, onto the edge strip 8 of the mounting rail 2 on the side of the housing opposite the retainer spring wires 4.

Figure 2:
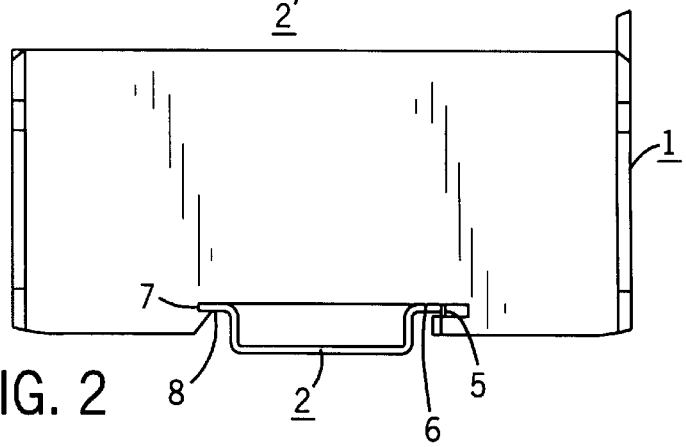
FIG. 2 is a side view of the quick mount base as seen in a longitudinal direction of the mounting rail.
Figure 3:
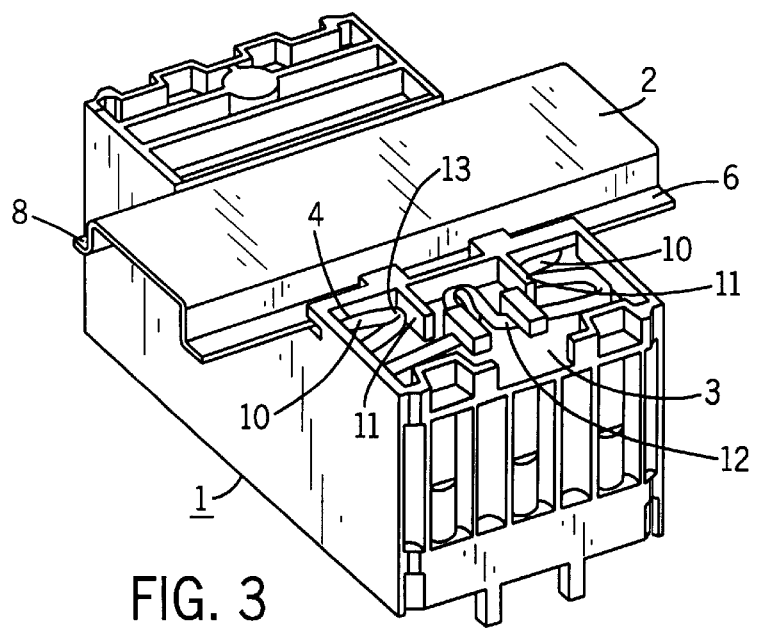
FIG. 3 is a perspective view of the quick mount base.

Each retainer spring wire 4 features an angled shape or portion at the part that faces the mounting rail 2, with two straight lines at an obtuse angle relative to each other, the shorter end area 9 of which terminates as a sharp edge and rests against the edge strip 6 of the mounting rail 2 with the tip 5 at a vertical angle (FIG. 2). The longer partial area 10 that connects to the shorter end area 9 is secured in housing 1 against longitudinal movement in the direction facing away from the shorter end area 9, in that it rests against support points 11 of the housing 1, as best illustrated in FIGS. 1 and 3. The longer partial area 10 of the retainer spring 4 is required to bend laterally. It should also be noted that the shorter end areas 9 of the angled retainer spring wires 4 include a greater vertical angle with regard to the longitudinal direction of the mounting rail 2 than the partial areas 10 held in the housing 1.

Referring to FIGS. 2 and 3, the longer partial areas 10 of two retainer springs 4 connect on a base part 12 as two one-piece bent knees 13. The base part 12 is formed of the same material and in one piece with the retainer spring wires 4. The bent knees 13 rest against the support points 11 of the housing 1.

The base part 12 is bent in a W-shape at the part provided for the attachment of the housing 1, whereby the W-shaped form-body is held in the housing 1 at the center and on both sides of center. Mounting takes place through elastic deformation of the mounting extension of the housing 1.

During the attachment of the housing 1 to the mounting rail 2, the housing 1 is pressed obliquely on edge strip 6, whereby tip 5 of the retainer spring wire 4 bends back in the catch groove of the housing 1 in a springy manner, so that housing 1 can be pressed down on the opposite side. After releasing the housing 1, the retainer spring wires 4 press the catch groove 7 of the housing 1 by means of the edge strip 8. The housing 1 is thus fastened to mounting rail 2.

When removing the quick mount base from mounting rail 2, the housing 1 is pressed to the mounting rail 2, so that the tips 5 of the retainer spring wire 4 are pressed back into the housing 1. In this manner, the edge strip 8 leaves the catch groove 7 on the side of the housing 1 opposite the retainer spring wire 4. In this position, the housing 1 and the entire quick mount base can be swiveled away from mounting rail 2 and removed.

During operation, the housing 1 of the quick mount base cannot slide away on the mounting rail 2 in the longitudinal direction, since the tips 5 of the retainer spring 4 grab onto edge strip 6 of mounting rail 2 and thereby the retaining spring wires 4, subjected to pressure, come to rest at the support points 11 of the housing 1. Two retainer spring wires 4 facing each other prevent the quick mount base from slipping away on the mounting rail 2 in both directions. The arrangement is self locking.

We claim:

1. A device for attachment of an electrical component to a mounting rail, the mounting rail having two opposed outwardly extending edge strips, said device comprising:

a housing adapted for removable connection with the mounting rail, the housing having a catch groove adapted for receiving one of said edge strips;

a retainer spring wire secured to the housing, the retainer spring wire having an end area extending from the housing for biased engagement against another one of said edge strips when said device is in an engaging position to hold the one of said edge strips against said catch groove to removably secure the housing to the mounting rail, the end area of the retainer spring wire terminating in a sharp edge such that a tip of the end area rests against the another one of said edge strips when said device is in an engaging position to prevent longitudinal movement of the housing along the mounting rail in a direction facing away from the tip of the retainer spring wire; and wherein the retainer spring wire includes a V-shaped portion and a fixed portion, the V-shaped portion including the tip at a first end and a second end coupled to the fixed portion, the fixed portion being fixed with respect to the housing the first end, the V-shaped portion including an obtuse angled section.

2. A device for attachment of an electrical component to a mounting rail, the mounting rail having two opposed outwardly extending edge strips, said device comprising:

a housing adapted for removable connection with the mounting rail, the housing having a catch groove adapted for receiving one of said edge strips; and a retainer spring wire secured to the housing, the retainer spring wire having an end area extending from the housing for biased engagement against another one of said edge strips when said device is in an engaging position to hold the one of said edge strips against said catch groove to removably secure the housing to the mounting rail, the end area of the retainer spring wire terminating in a sharp edge such that a tip of the end area rests against the another one of said edge strips when said device is in an engaging position to prevent longitudinal movement of the housing along the mounting rail in a direction facing away from the tip of the retainer spring wire; and wherein the retainer spring wire includes an angled portion with a shorter end area and a longer partial area of the retainer spring wire at an obtuse angel relative to each other, the shorter end area connected to the longer partial area and terminating in the sharp edge, the longer partial area being secured in the housing to prevent longitudinal movement of the longer partial area in the direction facing away from the shorter end area and permitting outward bending of the longer partial area.

3. The device of claim 2, wherein the shorter end area of the retainer spring wire is in a greater angled relationship relative to the longitudinal direction of the mounting rail than the longer partial area of the retainer spring wire.

4. A device for attachment of an electrical component to a mounting rail, the mounting rail having two opposed outwardly extending edge strips, said device comprising:

a housing adapted for removable connection with the mounting rail, the housing having a catch groove adapted for receiving one of said edge strips;

a retainer spring wire secured to the housing, the retainer spring wire having a pair of end areas extending from the housing for biased engagement against another one of said edge strips when said device is in an engaging position to hold the one of said edge strips against said catch groove to removably secure the housing to the mounting rail, the end areas of the retainer spring wire each terminating in a sharp edge such that a tip of each of the end areas rests against the another one of said edge strips when said device is in an engaging position to prevent longitudinal movement of the housing along the mounting rail; and wherein the retainer spring wire is a generally W-shaped, with a center portion fixed to the housing and the end areas being movable with respect to the housing.

5. A device for attachment of an electrical component to a mounting rail, the mounting rail having two opposed outwardly extending edge strips, said device comprising:

a housing adapted for removable connection with the mounting rail, the housing having a catch groove adapted for receiving one of said edge strips; and a retainer spring wire secured to the housing, the retainer spring wire having a pair of end areas extending from the housing for biased engagement against another one of said edge strips when said device is in an engaging position to hold the one of said edge strips against said catch groove to removably secure the housing to the mounting rail, the end areas of the retainer spring wire each terminating in a sharp edge such that a tip of each of the end areas rests against the another one of said edge strips when said device is in an engaging position to prevent longitudinal movement of the housing along the mounting rail; and wherein the retainer spring wire includes a pair of angled portions, each angled portion having a shorter end area and a longer partial area of the retainer spring wire at an obtuse angle relative to each other, the shorter end area being connected to the longer partial area and terminating in the sharp edge for each respective angled portion, each longer partial area being secured in the housing to prevent longitudinal movement of the longer partial area in the direction facing away from the shorter end area adjacent therewith and permitting outward bending.

6. The device of claim 5, wherein the shorter end area of one of the angled portions is in a greater angled relationship relative to the longitudinal direction of the mounting rail than the longer partial area of the one of the angled portions.

7. The device of claim 6, wherein each of the pair of end areas of the retainer spring wire is oriented facing generally away from each other.

8. The device of claim 7, wherein the retainer spring wire includes a pair of bent knees, each bent knee being adjacent to a respective longer partial area of one of said angled portions, each of the bent knees resting on support points of the housing.

9. The device of claim 8, wherein the retainer spring wire includes a base part positioned between the pair of bent knees, the base part having a W-shaped bent part, the base part being fastened to the housing by securing a center and both sides of the center of the W-shaped bent part to the housing.

10. A quick mount base for attachment of an electrical component to a mounting rail, the mounting rail having first and second edge strips, the quick mount base comprising:

a housing formed of plastic defining a hollow space, a catch groove adapted for receiving the second edge strip, and a channel defined between the hollow space and catch groove, the channel being sized for receiving the mounting rail therethrough;

at least one retainer spring wire disposed in the hollow space of the housing, an end area of the retainer spring wire extending outwardly towards the channel and terminating in a sharp edge such that a tip of the end area rests against the first edge strip of the mounting rail in a springy manner when said quick mount base is in an engaging position to press the catch groove of the housing onto the second edge strip of the mounting rail to secure the housing to the mounting rail and to prevent longitudinal movement of the housing along the mounting rail in the direction facing away from the tip of the retainer spring wire; and wherein the retainer spring wire includes an angle portion having a first leg including the tip and a second leg, the first leg and second leg defining an angle between 90 and 180 degrees, the second leg being prevented from moving in a longitudinal direction away from the tip by the housing.

11. A quick mount base for attachment of an electrical component to a mounting rail, the mounting rail having first and second edge strips, the quick mount base comprising:

a housing formed of plastic defining a hollow space, a catch groove adapted for receiving the second edge strip, and a channel defined between the hollow space and catch groove, the channel being sized for receiving the mounting rail therethrough;

at least one retainer spring wire disposed in the hollow space of the housing, an end area of the retainer spring wire extending outwardly towards the channel and terminating in a sharp edge such that a tip of the end area rests against the first edge strip of the mounting rail in a springy manner when said quick mount base is in an engaging position to press the catch groove of the housing onto the second edge strip of the mounting rail to secure the housing to the mounting rail and to prevent longitudinal movement of the housing along the mounting rail in the direction facing away from the tip of the retainer spring wire; and wherein the retainer spring wire includes an angled portion with a shorter end area and a longer partial area of the retainer spring wire at an obtuse angle relative to each other, the shorter end area connected to the longer partial area and terminating in the sharp edge, the longer partial area being secured in the housing to prevent longitudinal movement of the longer partial area in the direction facing away from the shorter end area and permitting outward bending of the longer partial area towards the channel.

12. The quick mount base of claim 11, wherein the shorter end area of the retainer spring wire is in a greater angled relationship relative to the longitudinal direction of the mounting rail than the longer partial area of the retainer spring wire.

13. The quick mount base of claim 10, wherein two retainer spring wires are oriented facing away from each other and connected on both ends to a base part in the hollow space of the housing in two one-piece bent knees, the retainer spring wires and the base part being formed as one piece from a spring wire and both bent knees rest on support points of the housing.

14. The quick mount base of claim 11, wherein each longer partial area of the two retainer spring wires connect at the two ends of a base part fastened in the hollow space of the housing as two one-piece bent knees, the retainer spring wires and the base part being formed as one piece from a spring wire and both bent knees rest on support points of the housing.

15. The quick mount base of claim 14, wherein the base part includes a W-shaped bent part, the base part being fastened to the housing by securing a center and both sides of the center of the W-shaped bent part to the housing.

* * * * *